United States Patent
Cobb, Jr.

(10) Patent No.: US 7,541,700 B2
(45) Date of Patent: Jun. 2, 2009

(54) PORTABLE MOTORISED DEVICE FOR GARDENING TOOLS

(75) Inventor: William T Cobb, Jr., St. Petersburg, FL (US)

(73) Assignee: EMAK S.p.A., Bagnolo in Piano, (Reggio Emilia) (IT)

( * ) Notice: Subject to any disclaimer, the term of this patent is extended or adjusted under 35 U.S.C. 154(b) by 0 days.

(21) Appl. No.: 11/434,264

(22) Filed: May 16, 2006

(65) Prior Publication Data
US 2006/0266324 A1  Nov. 30, 2006

(30) Foreign Application Priority Data
May 26, 2005  (IT) .................. RE20050017 U

(51) Int. Cl.
*H02K 7/14* (2006.01)

(52) U.S. Cl. ......................................... 310/50; 173/217

(58) Field of Classification Search .................. 310/50, 310/51, 47; 173/217, 213; 56/DIG. 18; 7/167
See application file for complete search history.

(56) References Cited

U.S. PATENT DOCUMENTS

| | | | | |
|---|---|---|---|---|
| 1,410,010 | A * | 3/1922 | Goldschmidt ................ | 173/49 |
| 4,078,589 | A * | 3/1978 | Miller ....................... | 81/57.14 |
| 4,081,704 | A * | 3/1978 | Vassos et al. ................ | 310/50 |
| 4,084,123 | A * | 4/1978 | Lineback et al. ............. | 320/111 |
| 4,365,376 | A * | 12/1982 | Oda et al. .................... | 15/22.1 |
| 4,677,329 | A * | 6/1987 | Secoura ....................... | 310/71 |
| 4,772,765 | A * | 9/1988 | Markle et al. ................ | 200/1 V |
| 5,017,109 | A * | 5/1991 | Albert et al. ................. | 418/152 |
| 5,661,960 | A * | 9/1997 | Smith et al. .................. | 56/12.7 |
| 5,774,993 | A | 7/1998 | Schlessmann | |
| 5,796,188 | A * | 8/1998 | Bays ........................... | 310/50 |
| 5,911,281 | A * | 6/1999 | Treskog et al. .............. | 173/104 |
| 5,934,884 | A * | 8/1999 | Son ............................. | 417/363 |
| 6,039,126 | A * | 3/2000 | Hsieh ......................... | 173/216 |
| 6,286,611 | B1 * | 9/2001 | Bone .......................... | 173/216 |
| 6,364,033 | B1 * | 4/2002 | Hung et al. .................. | 173/217 |
| 6,461,088 | B2 * | 10/2002 | Potter et al. ................. | 408/124 |
| 6,467,556 | B2 * | 10/2002 | Alsruhe ...................... | 173/217 |
| 6,595,300 | B2 * | 7/2003 | Milbourne ................... | 173/170 |
| 6,675,911 | B2 * | 1/2004 | Driessen ..................... | 173/216 |
| 6,675,912 | B2 * | 1/2004 | Carrier ........................ | 173/217 |
| 6,715,380 | B2 * | 4/2004 | Listl et al. ................... | 81/57.13 |
| 6,786,685 | B2 * | 9/2004 | Schaub et al. ............... | 408/240 |
| 7,096,974 | B2 * | 8/2006 | Obermeier et al. .......... | 173/217 |
| 2004/0188119 | A1 * | 9/2004 | Chen .......................... | 173/217 |

FOREIGN PATENT DOCUMENTS

| | | |
|---|---|---|
| DE | 76 35 497 U1 | 3/1977 |
| EP | 1 504 659 A1 | 2/2005 |
| GB | 708 353 A | 5/1954 |
| WO | WO 2004/045269 A1 | 6/2004 |

* cited by examiner

*Primary Examiner*—Dang D Le
(74) *Attorney, Agent, or Firm*—Browdy and Neimark, P.L.L.C.

(57) ABSTRACT

A portable motorized device (1) for gardening tools having a crankcase (2), a motor (3) housed in the crankcase (2), a drive shaft (4) associated with the motor (4) and suitable for actuating a tool, control device (7) of the motor (3), where said crankcase (2) comprises two hollow substantially symmetrical portions (2a, 2b) divided vertically along a plane parallel to the rotation axis of the drive shaft (4), a grip (5; 55) with which control device (7) of the motor are associated.

6 Claims, 2 Drawing Sheets

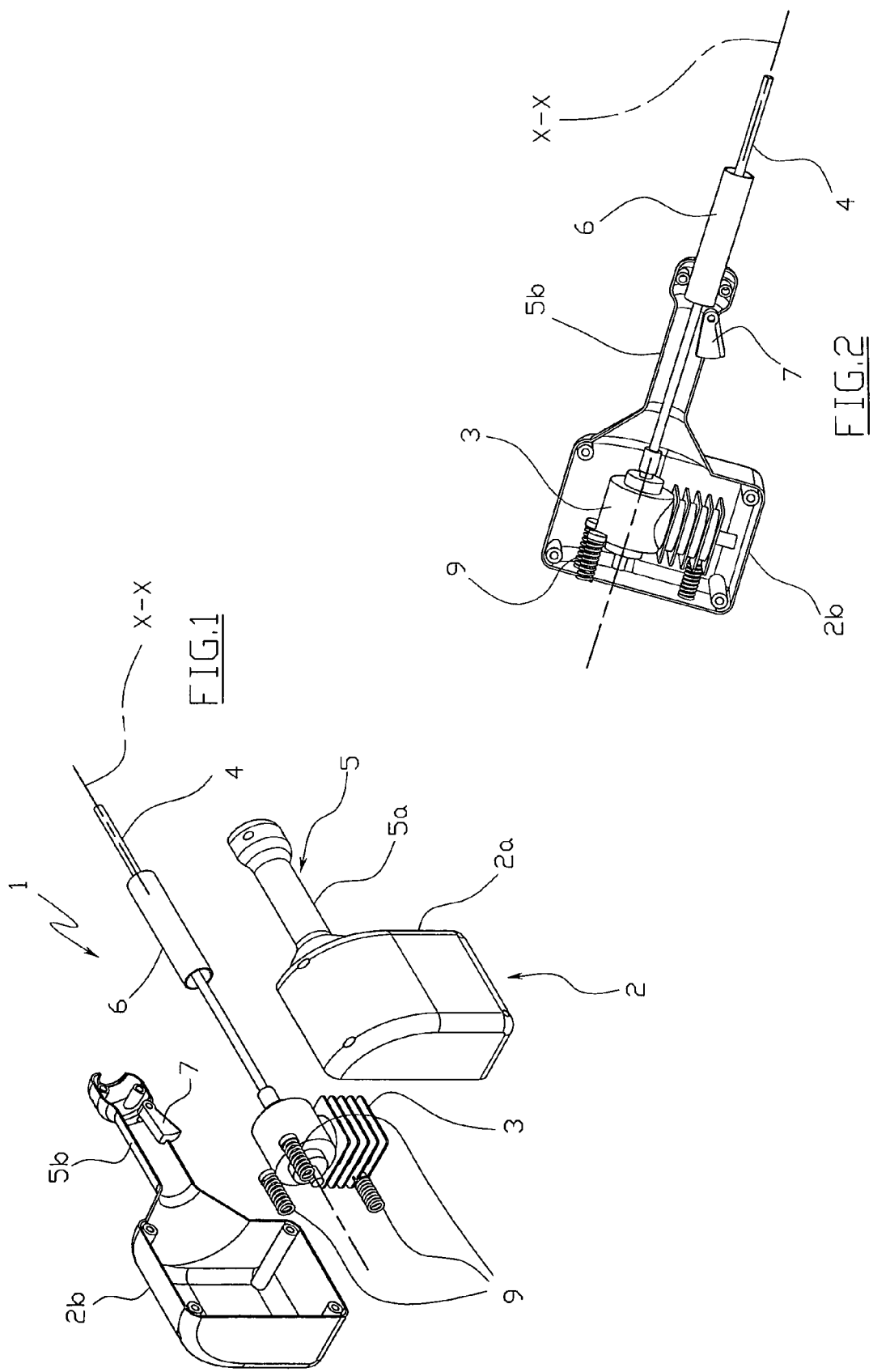

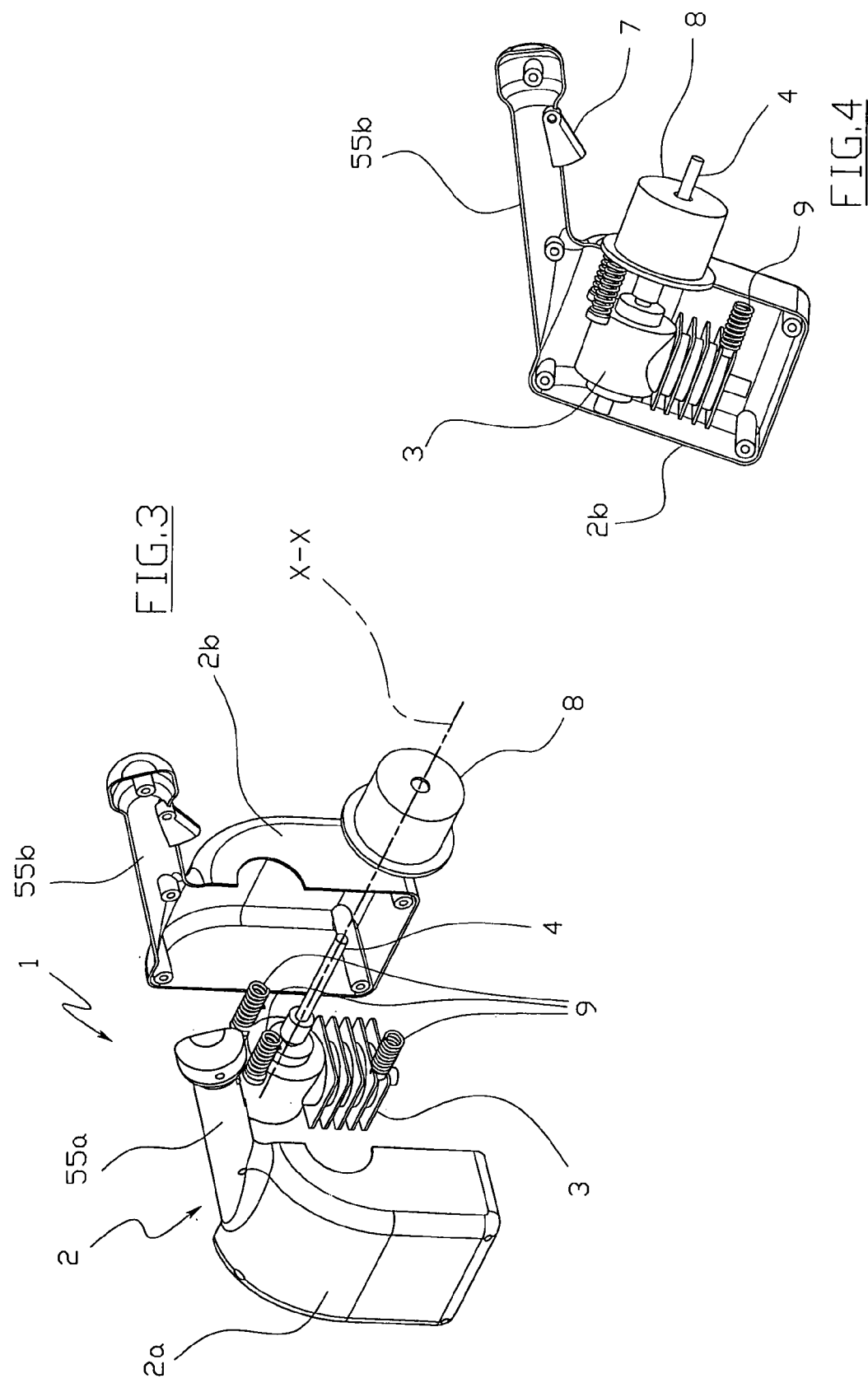

PORTABLE MOTORISED DEVICE FOR GARDENING TOOLS

BACKGROUND OF THE INVENTION

1. Technical Field of the Invention

The present utility model refers to a portable motorised device for gardening tools.

More specifically, the present finding refers to a portable motorised device for trimmers, blowers, pruners and the like.

2. Prior Art

The structure of devices of the prior art is relatively complicated since a certain number of component pieces have to be made that are assembled to obtain the device. Moreover, devices of the prior art are not without troublesome vibrations.

Since the market requires that such devices be as cost-effective and compact as possible, known structures are not therefore satisfactory from this point of view.

The purpose of the present finding is that of avoiding the aforementioned drawbacks providing a portable motorised device for gardening tools that is easy to manufacture and at the same time that is extremely compact and easy to use, thanks to the reduced amount of vibration.

Such a purpose is accomplished through a portable motorised device for gardening tools in accordance with claim 1.

The dependent claims outline preferred and particularly advantageous embodiments of the device according to the finding.

BRIEF DESCRIPTION OF THE DRAWINGS

Further characteristics and advantages of the finding shall become clear from reading the following description provided as an example and not for limiting purposes, with the help of the figures illustrated in the attached tables, in which:

FIG. 1 shows an exploded perspective view of a portable motorised device for gardening tools according to a first embodiment of the finding;

FIG. 2 shows a perspective view partially in section of the device of FIG. 1;

FIG. 3 shows an exploded perspective view of the device in accordance with a second embodiment of the finding;

FIG. 4 shows a perspective view of the device of FIG. 3, without parts of the crankcase.

DETAILED DESCRIPTION OF THE PREFERRED EMBODIMENTS OF THE INVENTION

With reference to the aforementioned figures, a portable motorised device for gardening tools in accordance with the present finding is globally indicated with 1.

By gardening tool we preferably mean a trimmer, a blower, a pruner and the like.

Said device 1 briefly comprises a crankcase 2, a motor 3 housed in the crankcase 2 and actuating a drive shaft 4 coupled with it, which projects from the crankcase 2 to actuate a tool, not illustrated. The motor 3 is controlled through suitable actuation means that shall be discussed hereafter.

In accordance with the present finding, the crankcase 2 comprises a grip 5 with which the motor control means are associated.

In particular, the crankcase 2 is formed from two hollow portions 2a, 2b, suitable for forming a closed shell, substantially symmetrical and divided vertically along a plane parallel to the rotation axis X-X of the drive shaft 4. The grip 5 is also formed from two substantially symmetrical parts 5a, 5b divided along the same plane.

According to the finding, each part 5a, 5b of the grip 5 is made from a single piece with a corresponding portion 2a, 2b of the crankcase 2.

Basically, the crankcase 2 and the grip 5, when they are joined along the line of separation, form the outer structure of the device 1 of the present finding making a compact structure that is easy to mount.

According to the first embodiment of the finding, illustrated in FIGS. 1 and 2, the grip 5 is arranged coaxially to the rotation axis X-X of the drive shaft 4 that crosses the inside thereof. In other words, the grip 5 projects from the base of the crankcase 2.

In this first embodiment, the grip 5 supports a protective pipe 6 for the shaft 4 of the motor 3 at its free end.

In order to allow easy control, the control means, which in the illustrated examples are in the form of an actuation lever 7, are directly associated with the grip 5, and in this first embodiment they are arranged at the based of the pipe 6.

In accordance with a second embodiment, illustrated in FIGS. 3 and 4, the grip 55 forms an angle of less than 90°, preferably about 45°, with the drive shaft 4, remaining coplanar to the shaft itself. Therefore, in this second embodiment, the grip 55 is formed on the top part of the crankcase 2. Also in this case the actuation lever 7 of the motor 3 is arranged near to the free end of the grip 55.

In this second embodiment it is foreseen to use a snap engagement system, associated with the crankcase 2 and arranged coaxially to the drive shaft 4 that crosses it and that allows the attachment and detachment of replaceable tools in the easiest of ways.

In order to insulate the vibrations caused by the motor 3 inside the crankcase 2, elastic elements are used, like for example coil springs 9, arranged between the motor 3 and the crankcase 2.

In particular, the springs 9 are arranged with their axis parallel to the rotation axis of the drive shaft 4 and at least two springs, not illustrated, perpendicular to it. The hollow portions 2a, 2b of the crankcase 2 with the corresponding parts 5a, 5b (55a, 55b) of the grip 5 (55) are made from plastic through usual moulding methods.

The assembly of the device 1 can easily be obtained, since it is possible to fix the motor 3 and the springs 9 in one of the portions 2a (or 2b) of the crankcase 2 and then close it with the remaining portion 2b (or 2a).

As can be appreciated from what has been described, the portable motorised device for gardening tools according to the present finding allows the requirements to be satisfied and allows the drawbacks mentioned in the introductory part of the present description with reference to the prior art to be overcome.

Indeed, the portable motorised device for gardening tools according to the finding makes it possible to have a compact unit that is easy to construct, as well as easy to produce.

Moreover, the motor control means are easy to access and manoeuvre ensuring an excellent ergonomic position since they are associated with the grip formed with the crankcase itself.

In addition, the control means are associated with the device so as not to ever interfere with the various tools during their engagement and disengagement with the device.

The absence of vibrations transmitted to the user thanks to the springs suitably arranged in the crankcase is an accomplishment worthy of note.

Of course, a man skilled in the art can bring numerous modifications and variants to the portable motorised device for gardening tools described above in order to satisfy contingent and specific requirements, all of which are covered by the scope of protection of the invention, as defined by the following claims.

The invention claimed is:

1. Portable motorised device (1) for gardening tools comprising,
   a crankcase (2),
   a motor (3) housed in the crankcase (2),
   a drive shaft (4) associated with the motor (4) and suitable for actuating a tool,
   control means (7) of said motor (3), wherein said crankcase (2) comprises two hollow substantially symmetrical portions (2a, 2b) divided vertically along a plane parallel to the rotation axis of the drive shaft (4),
   a grip (55) in which the control means (7) of the motor is engaged, wherein said grip (55) is formed from two substantially symmetrical parts (55a, 55b) divided vertically along a plane corresponding to the plane that divides the two portions (2a, 2b) of the crankcase (2), each of said parts (55a, 55b) formed as a unit with a corresponding portion (2a, 2b) of the two portions of the crankcase (2), and
   wherein said grip is coplanar to the shaft (4) and positioned on the top of the crankcase extending out from a back wall thereof so that a free end of the grip extends over and beyond a free end of the drive shaft so as to form only one fixed acute angle of less than 90° between the grip and the drive shaft.

2. Device (1) according to claim 1, in which said crankcase (2) supports a snap engagement system (8) arranged coaxially to the drive shaft (4) for attachment of replaceable tools.

3. Device (1) according to claim 1, comprising elastic means (9) fixed between the motor (3) and the crankcase (2) to insulate vibrations of the motor (3) from the crankcase.

4. Device (1) according to claim 3, in which said elastic means comprise a plurality of elastic elements (9) arranged with the axis thereof along which they exert their elasticity parallel to the rotation axis of the drive shaft (4).

5. Device (1) according to claim 4, wherein said elements comprise coil springs (9).

6. Device (1) according to claim 1, in which said portions (2a, 2b) of said crankcase (2) and said parts (55a, 55b) of said grip are formed from synthetic material.

* * * * *